United States Patent [19]
Felter

[11] 3,985,158
[45] Oct. 12, 1976

[54] BOX FOR MOUNTING DIFFUSERS

[76] Inventor: John V. Felter, 1307 Ashland, Houston, Tex. 77008

[22] Filed: May 28, 1974

[21] Appl. No.: 473,891

[52] U.S. Cl.............................. 138/149; 138/103; 138/178; 52/219; 98/40 C; 98/40 D
[51] Int. Cl.²........................ F16L 9/12; F16L 9/14
[58] Field of Search.................. 138/103, 178, 149; 52/218–221, 21, 714; 98/40 C, 40 D, 40 DL; 220/9 F, 71

[56] References Cited
UNITED STATES PATENTS

| | | | |
|---|---|---|---|
| 1,218,211 | 3/1917 | Rowe | 52/714 |
| 2,933,035 | 4/1960 | Phillips | 98/40 C |
| 2,978,136 | /1961 | Ehrenfreund | 220/9 F |
| 3,054,342 | 9/1962 | McVicar | 98/40 C |
| 3,070,253 | /1962 | Brown | 220/9 F |
| 3,266,408 | 8/1966 | Palmquist | 98/40 D |
| 3,522,724 | 8/1970 | Knab | 98/40 D |
| 3,559,560 | 2/1971 | Trahan | 98/40 D |
| 3,807,110 | 4/1974 | Kaminski | 52/219 |

Primary Examiner—Richard E. Aegerter
Assistant Examiner—James E. Bryant, III
Attorney, Agent, or Firm—Carl B. Fox, Jr.

[57] ABSTRACT

Box for mounting diffusers, wherein the main body of the box is made of expanded plastic or other similar material, and wherein one or more connection elements are molded within the walls of the box to provide for connection of the box to a building structure and to a duct, and to reinforce the box.

10 Claims, 8 Drawing Figures

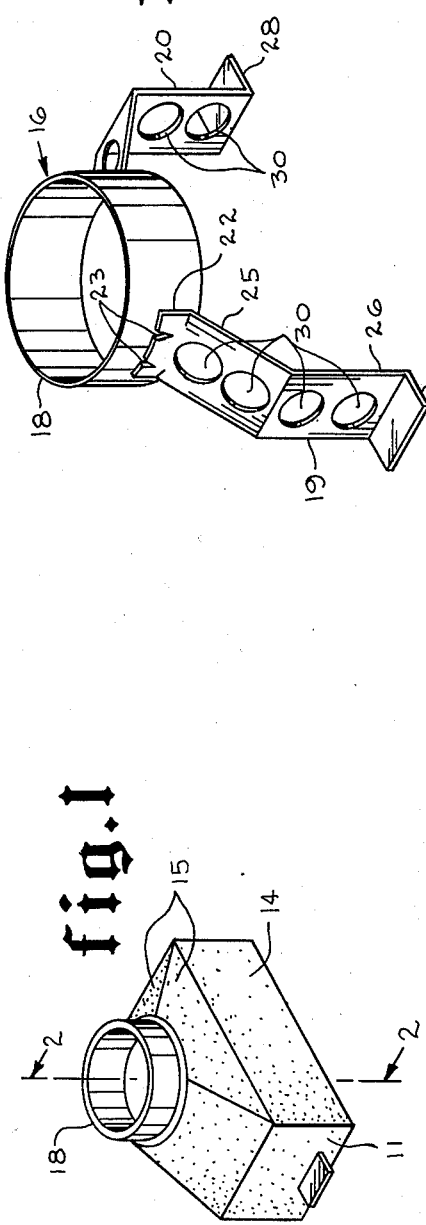
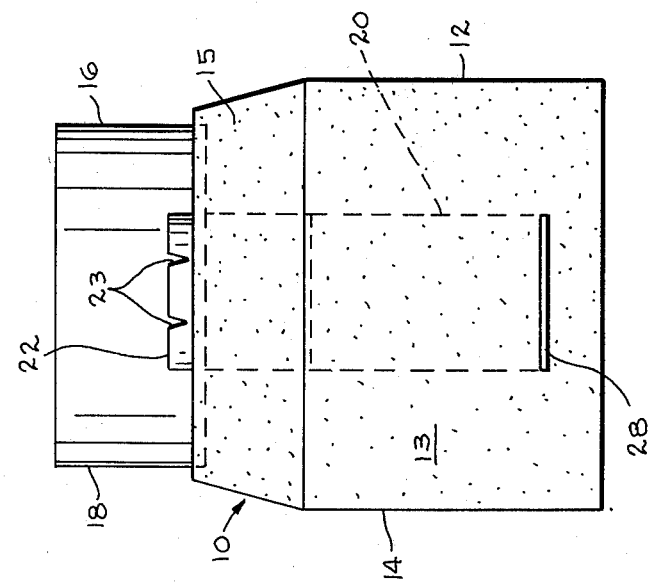
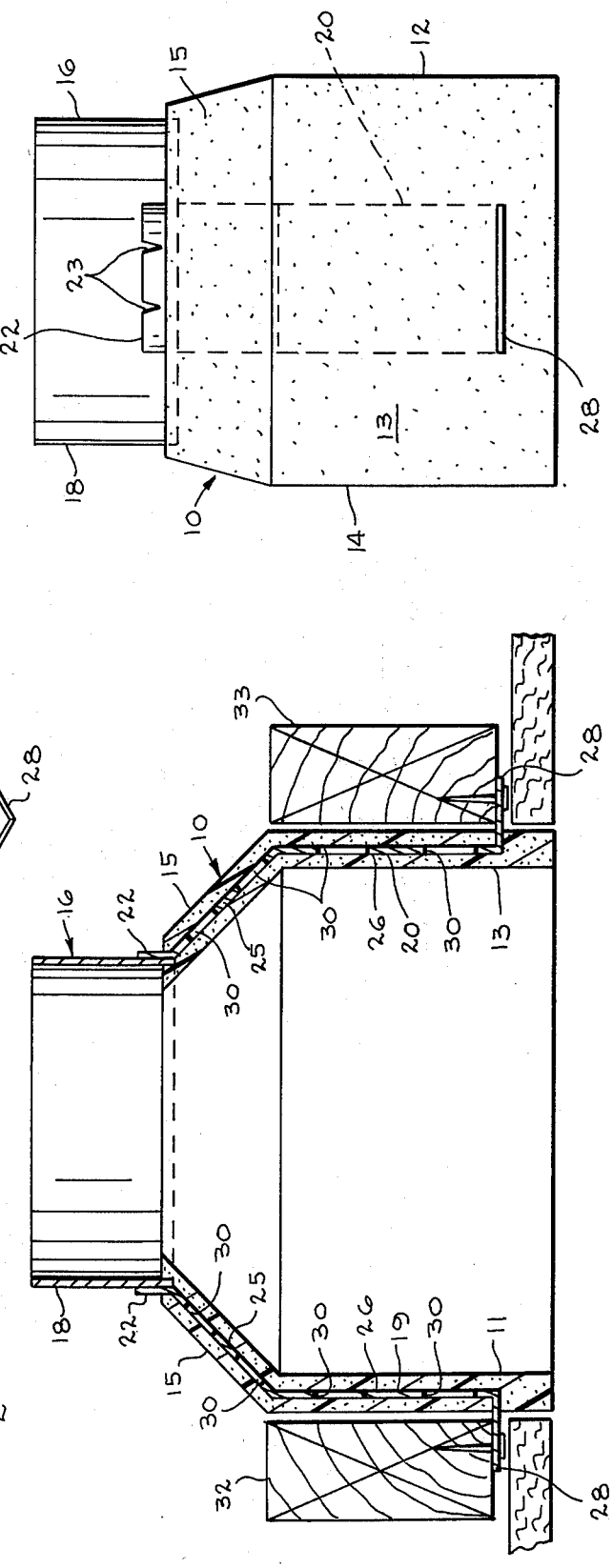

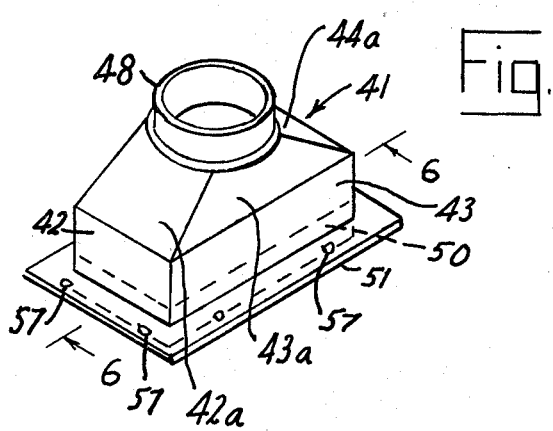
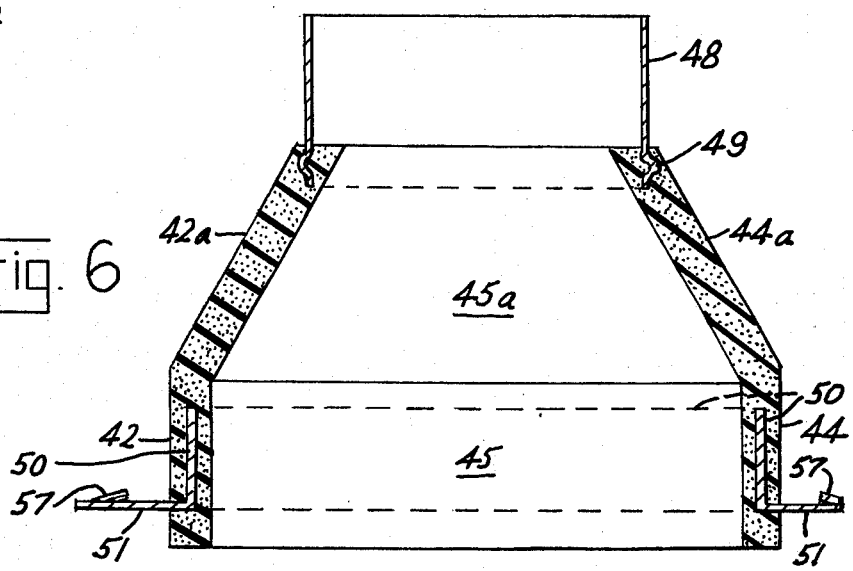
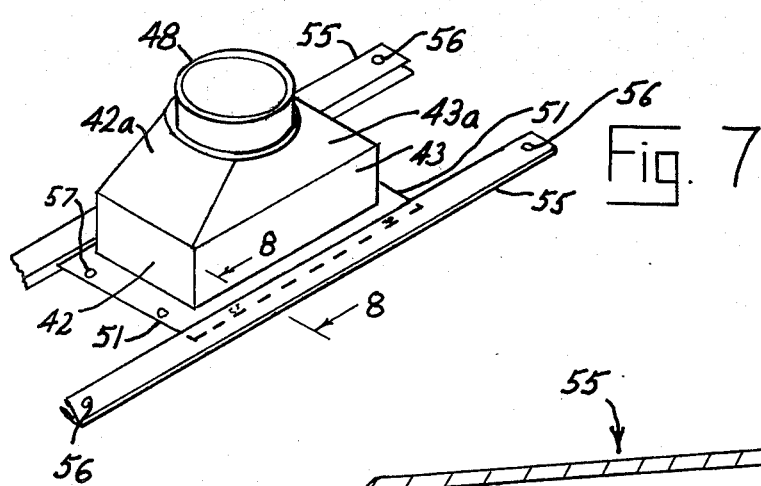
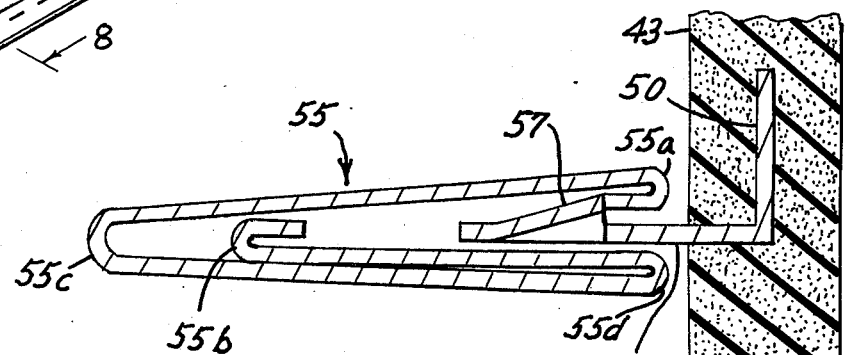

BOX FOR MOUNTING DIFFUSERS

SUMMARY OF THE INVENTION

Insulation of the boxes used to mount diffusers in ceilings, walls and floors is somewhat of a problem. The boxes have conventionally been made of sheet metal, such as galvanized iron, and the insulation must be applied to either or both of the inside and outside of the box either before or after it is installed. Cutting and fastening of the insulation to the box is tedius and time consuming, and thereby expensive.

According to the invention, boxes for mounting diffusers are provided wherein the main bodies of the boxes are molded of insulating material, and have metal spider or other connection assemblies molded within the box having exposed portions for connection of the boxes to building structures or supports and for connection to ducts of air conditioning, heating, or ventilating systems.

Installation of the boxes is done in the usual manner, by nailing or screwing them to wood or metal supports of a building structure. But once installed, each box is complete and self-insulating and no further provision of insulation is required.

The material of which the boxes are preferably formed is expanded two component micro-cellular rigid polyurethane plastic, but other materials may be used, if suitable. The expanding agent can be tricholoromonofloromethane or carbon dioxide or any other suitable blowing agent. Since the insulated walls are relatively thin, the material should have a high strength/weight ratio, and a low "K" value (thermal conductivity, in BTU/Sq/Ft./Hr/F/in — per ASTM D2326) for adequate insulation. Rigid polyurethane is a highly suitable material for molding the boxes, but other expanded plastics and the like may be used. Unexpanded composition materials of satisfactory insulating properties may also be used.

The diffusers are mounted in the openings or mouths of the boxes in the usual manner. The diffusers do not form a part of the invention, and are not shown or described.

The insulation forming the box may readily be joined with the duct insulation, providing a completely insulated assembly. Another benefit of the invention is that it provides diffuser mounting boxes which are inexpensive yet are entirely reliable in use.

A principal object of the invention is to provide diffuser mounting boxes which are dependable, inexpensive, and which are of simple design.

Another object of the invention is to provide diffuser mounting boxes which are self-insulating, and which are easy to install.

Other objects and advantages of the invention will appear from the following detailed description of preferred embodiments thereof, reference being made to the accompanying drawings.

BRIEF DESCRIPTIONS OF THE DRAWINGS

FIG. 1 is an upper perspective view of a preferred embodiment of apparatus according to the invention.

FIG. 2 is a vertical cross section of the apparatus of FIG. 1.

FIG. 3 is an end elevation of the apparatus of FIG. 1.

FIG. 4 is an upper perspective view of the connection spider of the apparatus of FIG. 1.

FIG. 5 is an upper perspective view of a modified form of apparatus according to the invention.

FIG. 6 is a vertical cross section taken at line 6—6 of FIG. 5.

FIG. 7 is an upper perspective view of the apparatus shown in FIGS. 5–6, showing connection strips connected thereto.

FIG. 8 is an enlarged partial vertical cross section taken at line 8—8 of FIG. 7.

DESCRIPTIONS OF THE PREFERRED EMBODIMENTS

Referring now to the drawings in detail, a diffuser mounting box 10 of preferred form is shown in FIGS. 1–4. The main body of the box is molded or otherwise fabricated of insulating material, preferably an expanded plastic such as rigid polyurethane. Other expanded or unexpanded materials may be used in constructing the boxes. Either extrusion or injection molding techniques may be used in forming the boxes. The materials employed should have good insulating properties so that the box may be used without additional provision for insulation.

Box 10 has side walls 11–14 which are angularly directed upwardly at their upper portions to provide a surrounding angular formation 15. A spider element 16 is imbedded in the plastic part of box 10 during molding to provide for connection of the box to a building structure and to provide for connection of the box to a duct.

Element 16 has a cylindrical collar or ring 18 of metal, such as galvanized iron or other suitable metal. Element 16, if desired, may be made of a rigid or substantially rigid plastic material. On opposite sides of ring 18, strips 19, 20 are connected thereto by welding or by other suitable method, such as by brazing or riveting. Each strip 19, 20 has its end 22 slitted as shown at 23 to adapt to the round contour of ring 18. This portion of each strip is directed angularly downwardly and outwardly at its portion 25, and from the lower end of each portion 25 the strips extend downwardly at portions 26. At the lower end of each strip, there is an outturned flange 28 which extends outwardly of the box wall for a short distance. Openings 30 through each strip may be provided if desired to lighten the weight thereof.

As is best shown in FIG. 2, the element 16 is imbedded within the molded plastic material of the box. While ideally the strips 19, 20 will be centered in the walls of the box as shown, to not be exposed at the inner or the outer surface of the box, this need not always be achieved. The strips may be exposed at the inner or outer surfaces of the plastic material of the box without detriment to the utility of the boxes. Even though the strips are at the inner or outer surfaces of the box walls, insulating material is present, at one or the other side of the strip which will still provide the necessary insulating function.

The collar or ring 18 is provided for connection of a duct to the box. The duct is connected in the customary manner, by slipping the duct into or around the collar, and usually secured by sheet metal screws or rivets or the like. The duct insulation may be brought up to the insulation afforded by the box, so that the assembly will be completely insulated.

The box is mounted to a building structure as shown in FIG. 2, by nailing or screwing through the flanges 28 to elements of the building structure, for example to wood joists 32, 33. Alternatively, the nailing or screwing of the box in place may be done through the upright portions 26 of the strips 19, 20.

As shown in the drawings, the flanges 28 are outturned at a location spaced from the bottom of the box walls. Their positions are such that a layer of sheetrock or other wall board may overlay the flanges and be flush with the mouth 35 of the box. Alternatively, if desired, the flanges 28 may be at the lower edge of the box, without the extending wall portion to adapt to the thickness of sheetrock or other wall board.

While two oppositely disposed strips 19, 20 are shown in the drawings, it is of course possible to provide any desired number of such strips. For example, two additional strips identical with or similar to strips 19, 20 may be provided at opposite positions each 90° from the strips 19, 20. By this provision, the box may be nailed to the building's structure at four points instead of at two. However, the provision of the two strips 19, 20 is usually sufficient. The strips 19, 20 may alternatively be provided in the longer side walls 12, 14, instead of in the shorter end walls 11, 13, as shown.

In addition to the function of the openings 30 to lighten the spider elements 16, these openings also provide for more adequate bonding of the molded plastic to the strips 19, 20. The openings 30 may be eliminated or modified as to size, shape and location. The molded rigid polyurethane or other insulating material of which the bodes are molded extends to imbed the lower rim of collar 18, in order that the structure is completely sealed.

Referring now to FIGS. 5–6 of the drawings, showing a modified form of diffuser mounting box 41, the overall form or shape of the box is the same as in FIGS. 1–4. Box 41 has vertical walls 42–45 which bend to converge upwardly at 42a–45a. The upper wall edges are conformed to a circular shape as shown in FIG. 5, and a lower edge portion of duct connection ring 48 is imbedded therein as shown in FIG. 6. Ring 48 preferably has a bead 49 around its imbedded portion to more securely affix the ring within the plastic.

A rectangular strip ring 50 having surrounding outwardly disposed flange 51 is imbedded within the molded plastic of walls 42–45, the flange extending from the walls around the box. The box may be mounted to a building element through use of flange 51. Ring 48, ring 50 and ring flange 51 are usually formed of sheet metal, but suitable plastic may be used instead. The expanded plastic of box 41 is the same as for the box of FIGS. 1–4.

In FIGS. 7–8, identical connection strips 55, 55 are shown connected to flange 51 of box 41. Flange 51 is provided with inwardly facing upwardly upset thumbnail connection formations 57 at spaced intervals therearound, preferably at least two being provided at each side of box 41.

Each strip 55 is longitudinally bent as shown in FIG. 8. Each strip 55 has edge bends 55a, 55b and intermediate bends 55c, 55d, to be three-layered as shown. The strips are longer than the side flanges 51 of the box, to extend longitudinally therebeyond at each end, and may be either slipped along the flange longitudinally to place edge bend 55a behind the thumbnail connection formation 57 at a side of the box, or may be similarly positioned by inserting flange 51 between bends 55a, 55d, and snapping bend 55a to behind the thumbnail formation. The strips 55 have end perforations 56 useful in connecting the strips to building structural members. As should be clear, the strips enable mounting of the box 41 between structural members too far apart for the box itself to span. The strips can be disposed on the flanges 51 at either the sides (as shown) or the ends of the box, and can extend to different lengths at opposite ends or sides of the box.

As should now be completely clear, the invention provides diffuser mounting boxes which are self-insulating and which may be easily installed in the customary manners and connected to a heating, air conditioning or ventilating duct. It will also be seen that the boxes are economical in design and light in weight, yet are satisfactorily durable for general use.

While preferred embodiments of the invention have been described and shown in the drawings, many modifications thereof may be made by a person skilled in the art without departing from the spirit of the invention, and it is intended to protect by Letters Patent all forms of the invention falling within the scope of the following claims.

I claim:

1. Box apparatus for mounting a diffuser, comprising an integral molded box formed of insulating material and having a first opening for connection to a duct and having a second opening for receiving a diffuser thereover, a sleeve adapted for telescopic engagement with a duct at one of its ends and having its other end imbedded in said molded insulating material around the edge of said first opening, and a horizontal flange having its inner portion imbedded in said molded insulating material adjacent said second opening and having its outer portion extending outward of said molded box adapted for connection to a building structure to support said box apparatus.

2. The combination of claim 1, said insulating material comprising expanded plastic.

3. The combination of claim 2, said plastic comprising rigid polyurethane.

4. The combination of claim 1, including strip means extending through said molded insulating material connected to said sleeve and to said flange.

5. The combination of claim 4, including plural said strip means disposed at opposite sides of said first and second openings.

6. The combination of claim 5, said second opening being bounded by walls of said box each parallel to the direction of said second opening, said flange means carried by each said strip being spaced above said second opening by the thickness of a layer of wallboard whereby wallboard installed around said box and said second opening has its outer surface flush with said box around said second opening.

7. The combination of claim 6, each said strip means having openings therethrough to decrease the weight thereof and to enhance bonding of each strip means within the wall of said box.

8. The combination of claim 7, said box having a rectilinear cross section in a direction parallel to said second opening, said first opening being circular and being disposed opposite said second opening, the walls of said box being shouldered to converge inwardly to said first opening.

9. The combination of claim 1, said flange extending completely around said second opening.

10. The combination of claim 9, including connection means spacedly disposed on said flange for connection of connector strip means to said flange, and connector strip means connected to said flange means by said connection means.

* * * * *